United States Patent Office 3,250,798
Patented May 10, 1966

3,250,798
2,3,4,5,6-PENTACHLORO-BENZYLIDENE MALONONITRILE
Alexander T. Shulgin, Lafayette, Calif., assignor to The Dow Chemical Company, Midland, Mich., a corporation of Delaware
No Drawing. Filed June 13, 1961, Ser. No. 116,688
1 Claim. (Cl. 260—465)

This invention concerns certain new substituted malonontriles, and particularly certain polychlorobenzylidenemalononitriles having a structure corresponding to the formula

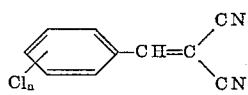

wherein $n$ represents an integer selected from 3, 4, and 5. In view of the present definition, it is apparent that compounds representative of the present invention include 2,3,4-trichlorobenzylidenemalononitrile; 2,3,5-trichlorobenzylidenemalononitrile; 2,3,6 - trichlorobenzylidenemalononitrile; 2,4,5 - trichlorobenzylidenemalononitrile; 2,4,6 - trichlorobenzylidenemalononitrile; 2,3,4,5-tetrachlorobenzylidenemalononitrile; 2,3,4,6 - tetrachlorobenzylidenemalononitrile; 2,3,5,6-tetrachlorobenzylidenemalononitrile; and pentachlorobenzylidenemalononitrile.

These new compounds are colorless crystalline solids somewhat soluble in many common organic solvents such as methyl ethyl ketone and of very low solubility in ethanol and in water. They are useful as parasiticides and are adapted to be employed for the control of many household pests such as insects, and agricultural pests such as weeds and fungus diseases.

The new compounds are prepared by causing a reaction between a polychlorobenzaldehyde and malononitrile. The reaction is advantageously carried out in a liquid reaction medium which may, for example, be ethanol and its progress is greatly expedited by the inclusion, in such reaction mixture, of a basic catalyst such as piperidine or triethylamine. Representative polychlorobenzaldehydes to be employed include 2,3,4-trichlorobenzaldehyde; 2,3,5 - trichlorobenzaldehyde; 2,3,6 - trichlorobenzaldehyde; 2,4,5 - trichlorobenzaldehyde; 2,4,6-trichlorobenzaldehyde; 2,3,4,5 - tetrachlorobenzaldehyde; 2,3,4,6 - tetrachlorobenzaldehyde; 2,3,5,6 - tetrachlorobenzaldehyde; and pentachlorobenzaldehyde.

In carrying out the reaction, the polychlorobenzaldehyde is intimately contacted with malononitrile. Preferably, the contacting is carried out in an inert solvent which may conveniently be a lower alkanol such as methanol, or ethanol. Starting materials are relatively soluble, and desired products relatively insoluble in such liquids. The reaction initiates readily at temperatures from 30° C. to 150° C.; therefore, the contacting of the reactants is conveniently carried out initially within such temperature range. In a preferred procedure, temperature ambient the reaction may conveniently be limited by the boiling temperature of the reaction solvent, which may be under reflux. A desired product prepared in the present method is stable under the boiling temperature of, for example, its own solution in ethanol. The reaction by which the present products are obtained takes place between equimolecular proportions of the polychlorobenzaldehyde and the malononitrile reactant. However, the reactants may be employed in any proportions. If employed proportions of reactants differ from equimolecular proportion, in general the reactant in excess thereof will appear as an impurity in, and may be removed from, the resulting product. The use of about equimolecular amounts is preferred.

Upon completion of the reaction, which, when lower alkanol is employed as solvent, is easily recognized by the cessation of evolution of further precipitate product, the reaction mixture is usually cooled to about room temperature or below, whereupon the desired product is easily separated as a solid by filtration or the like from the reaction mixture. Alternatively, the reaction mixture may be warmed under subatmospheric or atmospheric pressure to vaporize and remove liquid reaction medium, to obtain the desired product. When the desired product contains as impurity, unreacted starting material such material may be removed by washing with portions of a lower alkanol such as ethanol. The resulting product may be further purified by conventional techniques such as by washing with further portions of lower alkanol, and recrystallization from various organic solvents.

The following examples merely illustrate the present invention but are not to be construed as limiting it.

*Example 1.—2,4,5-trichlorobenzylidenemalononitrile*

A solution of 3.3 grams (0.05 mole) malononitrile in about 10 milliliters ethanol was added as a single portion, with stirring, to a solution of 10.48 grams (0.05 mole) of 2,4,5-trichlorobenzaldehyde in 50 milliliters of boiling ethanol. As catalyst two drops piperidine were added. A reaction resulted with the immediate formation of a crystalline precipitate. The reaction mixture was then chilled to 0° C., over an ice bath, whereupon product was removed by filtration. The product was washed with further ethanol and air dried. As a result of these operations there was obtained a 2,4,5-trichlorobenzylidenemalononitrile product as an off-white, crystalline solid melting at 111°–112° C., and having a nitrogen content, by analysis, of 10.82 weight percent as compared with a thereoretical value of 10.88 percent.

*Example 2.—2,3,6-trichlorobenzylidenemalononitrile*

In procedures exactly like the foregoing except that the employed benzaldehyde reactant was 2,3,6-trichlorobenzaldehyde, there was prepared a 2,3,6-trichlorobenzylidenemalononitrile product as a white crystalline solid melting at 73°–75° C., and containing 10.72 percent nitrogen by analysis as compared with a theoretical value of 10.87 percent.

*Example 3*

A solution of 2.9 grams (0.044 mole) malononitrile dissolved in 10 mililters ethanol was added as a single portion to a solution of 13 grams (0.047 mole) pentachlorobenzaldehyde in hot tetrahydrofuran. The said hot tetrahydrofuran solution was at a temperature of about 60°. Upon the completion of the combination of the said reactant solutions, 2 drops triethylamine and 2 drops piperidine were added as catalysts and the resulting mixture was stirred. Upon cooling the mixture, unreacted starting materials crystallized and precipitated and were removed from the product solution by filtration. The remaining mother liquor was concentrated by evaporation in air, and cooled to precipitate 5.5 grams of solid pentachlorobenzylidenemalononitrile product melting at 135–138° C. The said product was dissolved in 500 milliliters boiling hexane, filtered to remove insoluble impurities, and cooled to 0° C. Upon chilling of the hexane solution, a product crystallized and precipitated therein and was separated by filtration to obtain 3.2 grams of recrystallized pentachlorobenzylidenemalononitrile melting at 146–148° C. The product was found upon analysis to contain 53.8 percent of chlorine as compared with theoretical 54.31 percent.

In preparations essentially similar to the foregoing, the other polychlorobenzylidenemalononitrile products of the present invention are prepared.

The polychlorobenzaldehydes used as starting materials in the present invention are, for the most part, articles of commerce. Their preparation is old in the art being found in, for example, volume 7 of Beilstein's Handbuch.

The new polychlorobenzylidenemalononitriles of the present invention have been found to be useful as parasiticides and are adapted to be employed for the control of many pests. In this use the compounds have the desirable advantage over various related compounds that they are completely, or almost completely, nonsternutatory. For pesticidal use, the products may be dispersed on inert finely divided solids and employed as dusts. Also, such mixtures may be dispersed in water with the aid of a wetting agent and the resulting aqueous suspensions used as sprays. In other procedures, the products may be employed in oil, as oil-in-water emulsions, or water dispersions with or without the aid of dispersing or emulsifying agents. In a representative operation, the application as a thorough wetting spray to young tomato plants of a composition containing 2,3,6-trichlorobenzylidenemalononitrile at the rate of one half pound per hundred gallons of ultimate composition afforded commercially satisfactory protection against subsequent innoculation with viable spores of the fungus *Alternaria solani* whereas plants similarly innoculated with the fungus but without protection from the present compound were uniformly and heavily infested.

I claim:
2,3,4,5,6-Pentachlorobenzylidenemalononitrile.

References Cited by the Examiner
UNITED STATES PATENTS

| | | | |
|---|---|---|---|
| 2,465,318 | 3/1949 | Seymour | 260—465 |
| 2,683,659 | 7/1954 | Schlesinger et al. | 260—465 |
| 2,749,232 | 6/1956 | Liggett et al. | 260—465 |

OTHER REFERENCES

Gal et al.: Cancer Research, 1952, vol. 12, page 566.

Sturz et al.: Journal of American Chemical Society, 1949, volume 71, page 2949.

CHARLES B. PARKER, *Primary Examiner.*

LEON ZITVER, *Examiner.*

D. R. MAHANAND, *Assistant Examiner.*